United States Patent Office 2,970,980
Patented Feb. 7, 1961

2,970,980

VINYL CHLORIDE RESIN STABILIZED WITH A CHLORO SUBSTITUTED PHOSPHINE

Gerry P. Mack, Jackson Heights, N.Y., assignor, by mesne assignments, to Metal & Thermit Corporation, Rahway, N.J., a corporation of New Jersey No Drawing. Filed Apr. 10, 1958, Ser. No. 727,547

8 Claims. (Cl. 260—45.7)

The present invention relates to improved halogen-containing resins.

During the forming of resins into plastic sheets, rigid bodies, etc., the materials are worked at high temperatures. High temperature working of the material facilitates the forming operation and decreases the time during which heat treatment is needed, thus increasing capacity of the equipment. When worked at high temperatures resins deteriorate rapidly. This is evidenced first by a yellowing and then a progressive darkening of the material; the initially colorless transparent stock turning, in stages, yellow, tan and then brown, black and opaque.

I have now discovered a stabilizer which when incorporated in halogen-containing resins improves the stability of the resin.

It is an object of the present invention to provide stabilized halogen-containing resins.

The invention also contemplates providing resin compositions composed of mutually compatible materials that are stabilized against the deteriorative effects of heat and light.

Another object of this invention is to provide halogen-containing resins stabilized by non-volatile additives.

The invention also contemplates providing halogen-containing resin compositions of superior stability, prepared by the addition to the resin of a phosphine in conjunction with other stabilizers.

Other objects and advantages will become apparent from the following description.

Generally speaking, the present invention provides stabilized halogen-containing resins prepared by incorporating in the resin formulation a small but effective amount of a chloroethoxyphosphine derivative having the general formula:

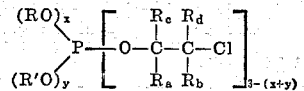

wherein $x$ and $y$ may each be 0 or 1, and and $x$ plus $y$ equals 1 or 2. R and R′ are selected from the class consisting of aliphatic, cycloaliphatic and aromatic groups. $R_a$, $R_b$, $R_c$, and $R_d$ are selected from the class consisting of hydrogen, aliphatic, cycloaliphatic and aromatic groups. The R, R′, $R_a$, $R_b$, $R_c$ and $R_d$ groups may be cyclized, fused or condensed with other R groups and they may be substituted with radicals, elements or groups not deleterious to the functions of the phosphine compounds in service, such as chlorine, alkoxy, aryloxy, etc. Preferred R and R′ groups for use in these phosphines are aliphatic and cycloaliphatic groups having not more than 18 carbon atoms in each group, phenyl groups, and alkyl substituted phenyl groups having not more than 12 carbon atoms in the substituents. Especially preferred R and R′ groups are those groups selected from the class consisting of octyl, phenyl, octylphenyl and nonylphenyl.

The chloroethoxy-containing phosphines may be prepared by reacting one part of a phosphorus trihalide with one or two parts of an organic alcohol or phenol having the general formula ROH. An epoxy-containing compound, sufficient to completely replace the chlorine attached to the phosphorus, is then added to the reaction mixture to form the mixed chloroethoxy-containing phosphine. In commercial manufacture it is preferable to use a slight excess of the epoxy-containing compound.

The epoxy-containing hydrocarbons are those that contain at least one epoxy group

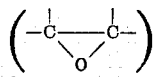

also known as an oxirane group, in the structure. These epoxy-containing hydrocarbons include ethylene oxide,
propylene oxide,
dipentene monoxide,
(di-1-methyl-1,2-epoxy-4-isopropenyl cyclohexane),
α-pinene oxide,
epoxidized glyceryl mono-oleate,
N-(n-hexyl)-9,10-epoxystearamide,
butyl epoxystearate,
methyl epoxystearate,
isooctyl epoxystearate,
2-chloroethyl epoxystearate,
phenyl epoxystearate,
tetrahydrofurfuryl epoxystearate,
p-tert-butyl epoxystearate,
butyl epoxytallate,
butyl epoxysoyate,
epoxidized glyceryl mono-ricinoleate,
p-(2,3-epoxypropoxy)phenyl urea,
3,4-epoxy-6-methylcyclohexane carboxylate,
epoxidized oleic acid,
glycidol,
β-methylglycidol,
β-ethylglycidol,
β-hydroxymethylglycidol,
allyl and methylallyl glycidyl ethers,
phenyl glycidyl ether,
tolyl glycidyl ethers,
naphthyl glycidyl ethers,
cyclopentyl glycidyl ether,
cyclohexyl glycidyl ether,
cyclohexene oxide,
epoxidized ethyl and vinyl cyclohexanol,
1-(2-phenylphenoxy)propylene oxide-2,3,
styrene oxide,
para-ethylstyrene oxide,
dimethylstyrene oxide,
ortho-methoxy styrene oxide,
4(2,3-epoxypropoxy)acetophenone,
para-tertiary amyl and para-secondary amyl phenoxy propene oxides,
isobutylene oxide,
bis(2,3-epoxypropyl)ether,
di-(2,3-epoxypropoxy)benzene,
1,2:5,6-diepoxyhexane,
p-divinylbenzene dioxide,
1-vinyl-3-hexene dioxide,
1,2,3,4-diepoxy-1,4-diphenyloctane,
phenoxy butylene oxide,
alpha-naphthoxy propylene oxide,
β-naphthoxy propylene oxide,
p-chlorophenoxy propylene oxide,
cresoxy propylene oxide,
diglycide ethers,
esters of epoxypropionic acid,
alkyl or aryl substituted ethylene and propylene oxides,
2,3-epoxydihydropyran.

For some purposes it may be desirable to utilize mixtures of the phosphines having varying chloroethoxy contents for use in this invention. Such mixtures can be made by mixing varying amounts of the mono-, di-chloroethoxyphosphines of this invention. Such mixtures can also be prepared by reacting less than equivalent parts of an alcohol or phenol to react with the phosphorus trihalide. The resulting alkoxychlorophosphine or aryloxychlorophosphine is then treated with an epoxy-containing hydrocarbon in an amount sufficient to replace the remaining reactive halogens. Although stoichiometric proportions of reactants are generally preferred, it is not necessary to use stoichiometric proportions, and may even be desirable not to use them under specified conditions.

Examples of the preparation of chloroethoxyphosphines used in this invention are shown below.

EXAMPLE 1

*Dinonylphenoxy-2-chloropropoxyphosphine*

To 0.5 mole of phosphorus trichloride dissolved in 15 ml. of toluene was added a solution comprising 1.0 mole of nonylphenol and 0.55 mole (10% excess) of propylene oxide. After the addition was complete, the reaction mixture was stirred under a vacuum and the product purified. However, the crude material could be directly used in the process of this invention.

EXAMPLE 2

*Didecyloxy-2-chloropropoxyphosphine*

To 0.5 mole of phosphorus trichloride was added 1.0 mole of decyl alcohol with stirring. The reaction temperature at the end of the stirring was 60° C. Stirring was continued at this temperature for 1 hour. Then the flask was evacuated for a period of several hours. To the resultant reaction mixture was added 0.55 (10% excess) mole of propylene oxide, slowly. The reaction is quite exothermic. When the addition of the propylene oxide was completed, the reaction mixture was maintained at 40° C. under vacuum for a period of two hours. This product is directly usable in the process of this invention.

Examples of the chloroethoxy-containing phosphines are: didecyloxy-2-chloropropoxyphosphine, di(tridecyloxy)-2-chloroproxyphosphine, di(nonylphenoxy)-2-chloro - 2 - phenylethoxyphosphine, di(nonylphenoxy)-2 - chloropropoxyphosphine, phenoxy(nonylphenoxy)-2 - chloropropoxyphosphine, diphenoxy - 2 - chloropropoxyphosphine, di(octylphenoxy) - 2 - chloro - 3-propeneoxypropoxyphosphine, di(nonylphenoxy) - 2-methoxypropoxyphosphine, di(nonylphenoxy) - 2 - chlorododecyloxyphosphine, di(nonylphenoxy) - 2 - chloro-octyloxyphosphine; and the chloroethoxy-phosphine compounds prepared by the reaction of the following components: chlorophenoxy(nonylphenoxy)phosphine and butyl epoxystearate, dichloro(nonylphenoxy)phosphine and vinylcyclohexene dioxide, dichloro(nonylphenoxy)phosphine and butadiene dioxide, chloro(dinonylphenoxy)phosphine and butylepoxystearate, chloro-(dioctylphenoxy)phosphine and butyl epoxystearate, chlorophenoxy(nonylphenoxy)phosphine and epoxidized soya bean oil triglyceride, and chloro(dioctylphenoxy)-phosphine with epoxidized soya bean oil triglyceride.

The epoxidized oil referred in the specification and claims as "epoxidized soya bean oil" or "epoxidized soya bean triglyceride" is an article of commerce sold by Rohm and Haas and identified by the manufacturer by the symbol G60. The manufacturer's specifications indicate that this material has an epoxy oxygen content of six to six and one-half and an iodine number of two to six.

Many materials have been found to be effective stabilizers in that they retard, in some degree, the deteriorative effects of heat and/or light. However, to be suitable for commercial use, the stabilizers must be compatible in the resin, must have a minimum of plate-out during milling, must be non-volatile under the conditions of use and must retard the deteriorative effects of heat and/or light. This last property is usually determined by examination of the color and clarity of resins tested after subjection to high temperatures. The most desirable stabilized resins are those that are initially clear and transparent and retain this condition for the longest period of time. The onset of a distinct yellow cast to a transparent stabilized resin is an indication of the limit of usefulness of the resin. The stabilizers of the present invention are particularly effective in this respect. Resins formulated with these stabilizers do not show effects of yellowing for long periods of time. This permits the formulation and manufacturing of halogen resins which contain the stabilizers of this invention at more elevated temperatures. The stabilizers of this invention also render halogen-containing resins resistant to heat deterioration on storage and usage afterwards. At the same time the stabilizers of this invention are non-volatile under the conditions of use and their odor cannot be detected.

The following examples are illustrative of the invention.

As used herein, the terms "parts" or "part" indicate parts by weight, unless otherwise specified.

In Examples 3 to 9 below, polyvinyl chloride resin formulations containing the stabilizer compositions of this invention were prepared by milling the base resin formulation and stabilizer components together for 5 minutes on a 2-roll differential speed mill, at 320° F. The resin, having the stabilizer incorporated therein, was removed as a pressed sheet and cut into strips for testing. For comparison purposes the base resin formulation without stabilizer was similarly processed. To test the heat stability of the strips with and without the stabilizers, samples of each were placed for forty-five minutes in a circulating air oven maintained at 350° F., and then removed. The samples were inspected and rated as to their color.

EXAMPLE 3

A stabilized test strip was obtained by milling 0.5 part of di(decyloxy)-2-chloropropoxyphosphine stabilizer into 100 parts of vinyl chloride polymer as described above. After 45 minutes in the oven, the stabilized resin test strip had a light yellow appearance while the unstabilized resin test strip appeared brown.

EXAMPLE 4

To 100 parts of vinyl chloride polymer was added 0.5 part of di(nonylphenoxy)-2-chloro-2-phenylethoxyphosphine by the milling process described above. The appearance of the stabilized test sample was light yellow after the 45 minute heating period as compared to a brown appearance of a test strip of the nonstabilized vinyl chloride polymer.

EXAMPLE 5

Di(octylphenoxy) - 2 - chloropropoxyphosphine (0.5 part) was added to 100 parts polyvinyl chloride by the milling process described above. Upon the completion of the heat test, the stabilized resin test strip had a light yellow appearance whereas the unstabilized resin test strip was brown.

EXAMPLE 6

Di(nonylphenoxy) - 2 - chlorododecyloxyphosphine (0.5 part) was milled into 100 parts of polyvinyl chloride as described above. The stabilized resin test strip had a light yellow appearance at the end of the heating period whereas the unstabilized resin had a brown appearance.

EXAMPLE 7

Polyvinyl chloride (100 parts) was stabilized as described above with 0.5 part of the reaction product prepared from 1 mole of chlorodi(octylphenoxy)phosphine and 1 mole of butyl epoxystearate. After heat testing, the stabilized resin test strip had a colorless appearance as compared to the brown appearance of the unstabilized resin test strip.

EXAMPLE 8

Polyvinyl chloride resin (100 parts) was stabilized as described above by 0.5 part of the reaction product formed from 1 mole of chlorophenoxy(octylphenoxy)-phosphine with 1 mole of epoxidized soya bean oil triglyceride. A test strip of this stabilized resin had a light yellow appearance after heat exposure as compared to a brown appearance of similarly exposed unstabilized resin test strips.

EXAMPLE 9

Polyvinyl chloride resin (100 parts) was stabilized as described above with 0.5 part of the reaction product formed from 1 mole of chlorodi(nonylphenoxy)phosphine and 1 mole of epoxidized soya bean oil triglyceride. After heat exposure, the stabilized resin test strip appeared colorless while the unstabilized test strip appeared brown.

The color of the polyvinyl resin stabilized by the compounds of this invention shown in Examples 3 to 9 was essentially unchanged by the heat treatment. However, in the case of the nonstabilized polyvinyl chloride, the color was in all cases substantially changed by the heat treatment to brown. The stabilizing compositions can be used from about 0.5 part to about 5 parts per 100 parts of the halogen-containing resin. Preferably about 1–3 parts per 100 parts of halogen-containing resins are used.

The chloroethoxy-containing phosphine compounds of this invention are advantageously used in conjunction with other stabilizers, e.g. metallic salts of organic acids, metallic phenolates, diorganotin salts of organic acids, etc., to yield resins having superior stability. Preferred polyvalent metal salts of organic acids include the salts of cadmium, zinc, lead, tin, barium, strontium and calcium. Some preferred examples of these salts are cadmium benzoate, cadmium di(t-butylbenzoate), barium laurate, calcium laurate, and mixtures thereof. The phenolate metal salts which may be used include those of cadmium, zinc, lead, tin, barium, strontium and calcium. Illustrative examples of the phenolates which may be employed in conjunction with the compounds of this invention are salts of nonylphenol, oleylphenol and laurylphenol. Some preferred phenolates are barium phenolates containing straight chain alkyl substituents having 6 to 13 carbon atoms on the phenyl ring; especially preferred are barium octylphenolate and barium nonylphenolate. The organotin stabilizers which may be used in conjunction with the compounds of this invention include the diorganotin salts of organic acids, diorganotin derivatives of mercapto compounds, as for example, mercaptoacid esters and mercaptans. Some preferred examples of the tin stabilizers include dibutyl-tin-S,S'-bis-isooctylmercaptoacetate and dibutyltin-S,S'-bis-laurylmercaptide.

Examples 10 to 12 are further illustrative of the utilization of the chloroethoxyphosphine stabilizers of the present invention in conjunction with other stabilizers.

EXAMPLE 10

A base resin formulation was prepared, comprising 100 parts of polyvinyl chloride resin, 50 parts of dioctyl-phthalate and 2 parts of a mixture prepared from barium laurate and cadmium laurate (2:1). To this base formulation was added 0.5 part of di(nonylphenoxy)-2-chloro-dodecyloxyphosphine by milling the mixture for 5 minutes on a 2-roll differential speed mill at 320° F. A strip was prepared and tested for heat stability by placing it in a circulating air oven maintained at 300° F. for 45 minutes. At the end of this time the test strip was essentially clear in appearance. A nonstabilized strip had a brown appearance after the heat treatment.

EXAMPLE 11

Polyvinyl chloride resin (100 parts) was stabilized by milling into it, as described in Example 10, 0.6 part of barium di(nonylphenolate) and 0.3 part of cadmium di(p-tert-butylbenzoate) and 0.5 part of the reaction product formed from 1 mole of phenoxy(octylphenoxy)-chlorophosphine and 1 mole of epoxidized soya bean oil triglyceride. A test strip maintained at 350° F. for 45 minutes had an essentially clear appearance. A nonstabilized comparison strip had a brown appearance after the heat treatment.

EXAMPLE 12

Polyvinyl chloride resin is stabilized by milling into it 3 parts of dibutyltin-S,S'-bis-isooctylmercaptoacetate and 0.5 part of di(octylphenoxy)-2-chloropropoxyphosphine (as described in Example 10). The stabilized resin was tested for 45 minutes at 350° F. as described in Example 10. The stabilized resin had an essentially clear appearance, whereas an unstabilized comparison sample had a brown appearance, after this heat treatment.

Examples 13 to 15 further illustrate the stabilizing properties of the compounds used in this invention in plasticized halogen-containing resins.

EXAMPLE 13

Two samples were prepared containing one part of chlorinated rubber (67% chlorine) dissolved in three parts of toluene. To the second sample was added 3% by weight of dibutyl phthalate and 4% by weight of epoxidized soya bean oil based on the chlorinated rubber. The same amounts of the aforementioned plasticizers were added to the first sample and also 2 parts per 100 parts of chlorinated rubber of a stabilizer containing 0.6 of barium di(butylphenolate), 0.3 cadmium di(p-tert-butylbenzoate), 0.3 di(nonylphenoxy)-2-chloropropoxy-phosphine and 0.8 isooctyl alcohol. Films were cast on glass and heated in an air circulating oven held at 140° C. for 35 minutes. The film prepared from the first sample had a very pale yellow cast, whereas the film prepared from the second sample turned a pale amber.

EXAMPLE 14

Two samples comprising 100 parts of a vinyl chloride-acetate copolymer (95% chlorine) were dry blended with 30 parts of dioctyl phthlate. The first sample was stabilized with 0.5 part of the reaction product formed from one mole of chloro(di-octylphenoxy)phosphine and one mole of butyl epoxystearate per 100 parts of said copolymer. Each of the samples was then worked on a rubber mill at about 300° F. for 40 minutes. The first sample, which included the barium-cadmium stabilizer, had a very pale yellow tint, whereas the second sample (unstabilized) was a dark yellow.

EXAMPLE 15

Two samples comprising 100 parts of a vinyl chloride-dibutyl maleate copolymer were dry blended with 35 parts of dibutyl sebacate. The first sample was stabilized as specified in Example 14 and both samples worked as specified in Example 14, with similar results.

Generally speaking, the halogen-containing resins, which are rendered heat and light resistant by the stabilizers of this invention, are polymers of vinyl chloride and vinyl resins containing vinyl chloride units in their structure, such as copolymers of vinyl chloride with vinyl esters of aliphatic carboxylic acids, particularly vinyl acetate, copolymers of vinyl chloride with esters, nitriles and amides of unsaturated carboxylic acids, e.g. of acrylic and methacrylic acid, copolymers of vinyl chloride with diene compounds and with unsaturated dicarboxylic acids or their anhydrides, such as copolymers of vinyl chloride with diethyl maleate, diethyl fumarate or maleic anhydride, after-chlorinated polymers and copolymers of vinyl chloride, polymers of vinylidene chloride and copolymers of the same with vinyl chloride and other polymerizable compounds; polymers of vinyl chloroacetate and dichlorodivinyl ether; chlorinated polymers of vinyl acetate, chlorinated polymeric esters of acrylic and alpha-substituted acrylic acids; polymers of chlorinated styrenes, for instance, dichlorostyrene; chlorinated rubber, chlorinated polymers of ethylene, polymers and after-chlorinated polymers of chlorobutadiene, and their copolymers with vinyl chloride; rubber hydrochloride and chlorinated rubber hydrochloride; and mixtures of the polymers recited herein with each other or other polymerizable compounds.

The stabilizers of the present invention are also effective stabilizers for organosols and plastisols. Plasticizers commonly used in plasticized resins, organosols and plastisols, include esters of the following acids; phthalic acid, adipic acid, sebacic acid, azelaic acid, citric acid, aconitic acid, tricarboxylic acid, maleic, fumaric, succinic, phosphoric acid, and mercapto acids like thioglycolic acids and the like; esters of dihydric and polyhydric alcohols, such as glycol, glycerol, pentaerythritol, sorbitol and the like; esters of thioglycols and other sulfur-containing derivatives; amino alcohol derivatives; ester amides, sulfonamides and other amides, chlorinated plasticizers, and carbonic acid derivatives derived from phosgene.

The stabilizers of this invention are useful with halogen-containing resins having other stabilizers, ultraviolet absorbers and plasticizers.

While the invention has been described with particular reference to specific embodiments, it is to be understood that it is not limited thereto but is to be construed broadly and is to be restricted solely by the scope of the appended claims.

I claim:

1. A vinyl chloride resin stabilized against discoloration by incorporating therein a phosphine having the general formula

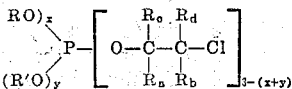

wherein $x$ and $y$ are numbers from 0 to 1; $x$ plus $y$ equals 1 to 2; and wherein R and R' are selected from the class consisting of aliphatic, cycloaliphatic and aromatic groups, and wherein $R_a$, $R_b$, $R_c$ and $R_d$ are selected from the class consisting of hydrogen, aliphatic, cycloaliphatic and aromatic groups.

2. A composition as defined in claim 1 in which the resin is a vinyl chloride copolymer.

3. A composition as defined in claim 1 in which the resin is polyvinyl chloride.

4. A stabilized composition as defined in claim 1 in which there is added a secondary polyvinyl chloride stabilizer selected from the class consisting of polyvalent metal salts of organic carboxylic acids, polyvalent metal phenolates and tetravalent organotin compounds.

5. The composition of claim 1 in which the phosphine is dinonylphenoxy-2-chloropropoxyphosphine.

6. The composition of claim 1 in which the phosphine is the reaction product of one mole of chlorodi(nonylphenoxy)-phosphine and one mole of epoxidized soya bean oil triglyceride.

7. A composition according to claim 1 wherein the amount of phosphine is between about 1 and about 3 parts by weight per 100 parts of resin.

8. The composition of claim 1 in which the phosphine is dioctylphenoxy-2-chloropropoxyphosphine.

References Cited in the file of this patent

FOREIGN PATENTS 1,119,752    France _____ Apr. 9, 1956